(12) United States Patent
Higashimoto et al.

(10) Patent No.: US 9,536,543 B2
(45) Date of Patent: Jan. 3, 2017

(54) INFORMATION PROCESSING DEVICE, STORAGE MEDIUM, AND METHOD

(71) Applicant: Sony Corporation, Tokyo (JP)

(72) Inventors: Kimu Higashimoto, Tokyo (JP); Junko Saito, Kanagawa (JP); Tetsuhiro Sakamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/450,400

(22) Filed: Aug. 4, 2014

(65) Prior Publication Data

US 2015/0051903 A1    Feb. 19, 2015

(30) Foreign Application Priority Data

Aug. 13, 2013    (JP) ................. 2013-168209

(51) Int. Cl.
*G06F 17/27* (2006.01)
*G10L 21/10* (2013.01)

(52) U.S. Cl.
CPC ........... *G10L 21/10* (2013.01); *G06F 17/2785* (2013.01)

(58) Field of Classification Search
CPC .............................................. G06K 2207/1012
USPC .................. 704/9, 2, 3, 260, 258, 270, E13.002, 704/E13.008, E21.02; 709/204; 707/769, 707/E17.014; 715/776; 345/473, 419; 340/4.13

See application file for complete search history.

(56) References Cited

U.S. PATENT DOCUMENTS

| | | | |
|---|---|---|---|
| 7,973,793 B2 * | 7/2011 | Yasugi | G06T 13/00 345/419 |
| 2011/0191368 A1 * | 8/2011 | Muzatko | 707/769 |

FOREIGN PATENT DOCUMENTS

JP    2008-508634    3/2008

* cited by examiner

*Primary Examiner* — Charlotte M Baker
(74) *Attorney, Agent, or Firm* — Oblon, McClelland, Maier & Neustadt, L.L.P.

(57) ABSTRACT

There is provided an information processing device including an input unit to which words are input, an analysis unit configured to analyze meanings of the respective words, an image generation unit configured to generate single images corresponding to the respective words, and a display control unit configured to control the images generated by the image generation unit to be displayed on a display unit.

19 Claims, 8 Drawing Sheets

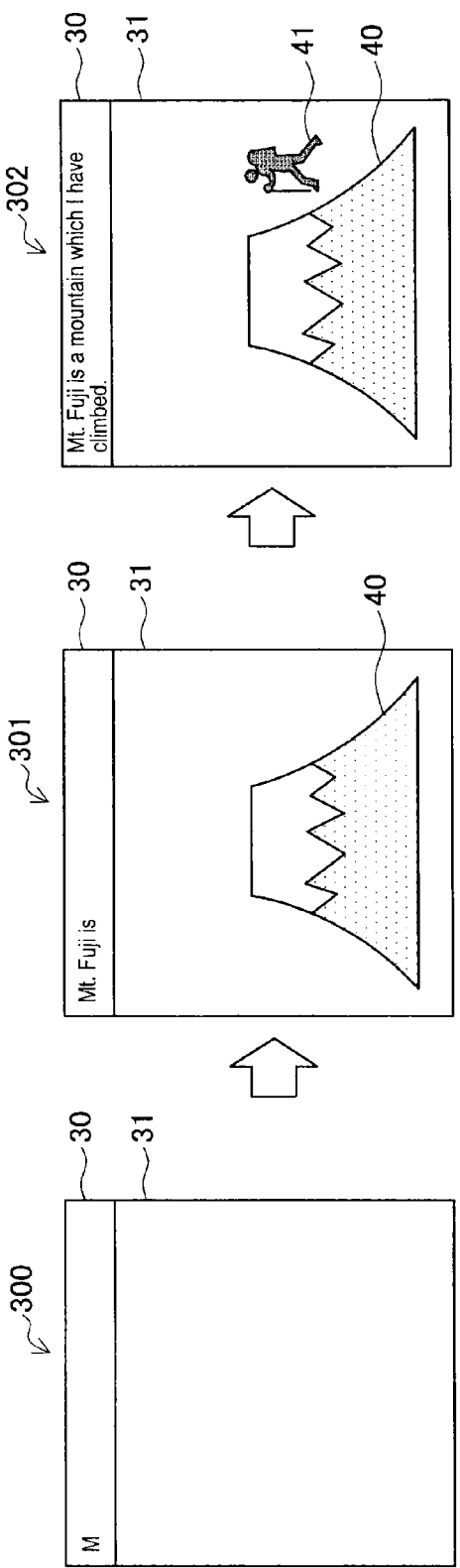

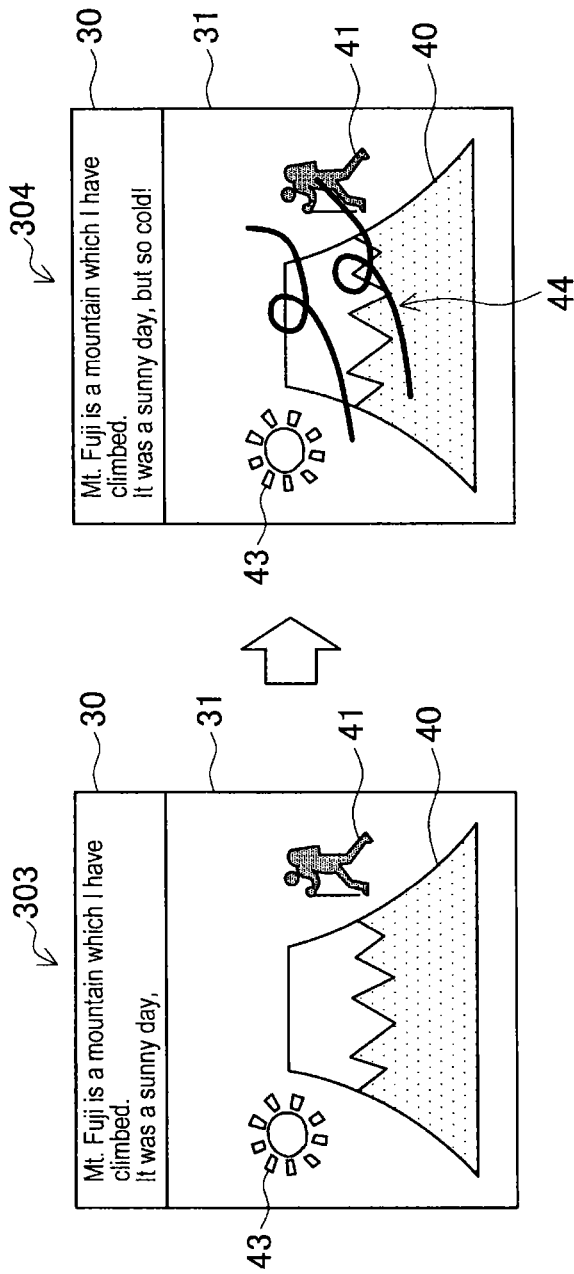

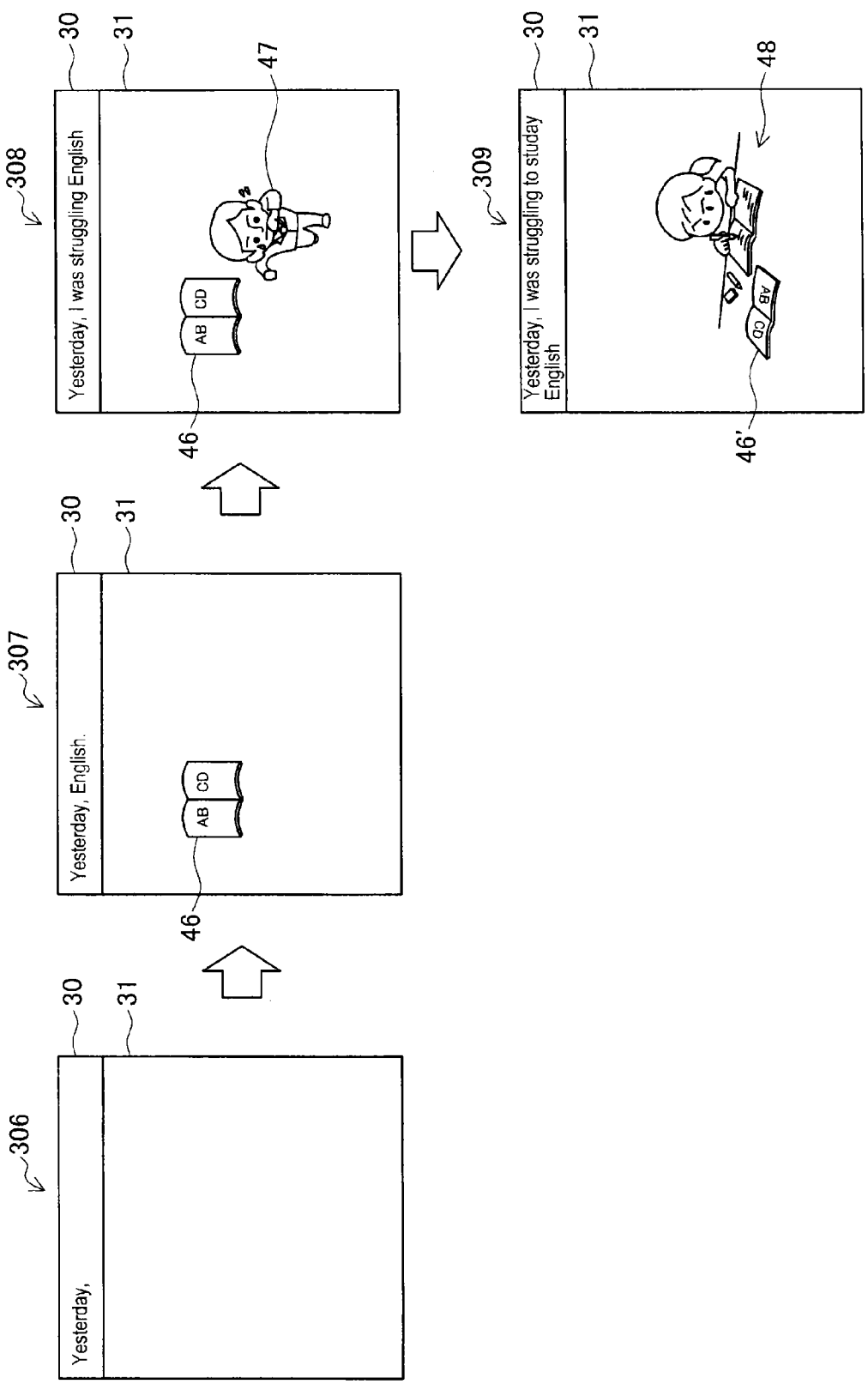

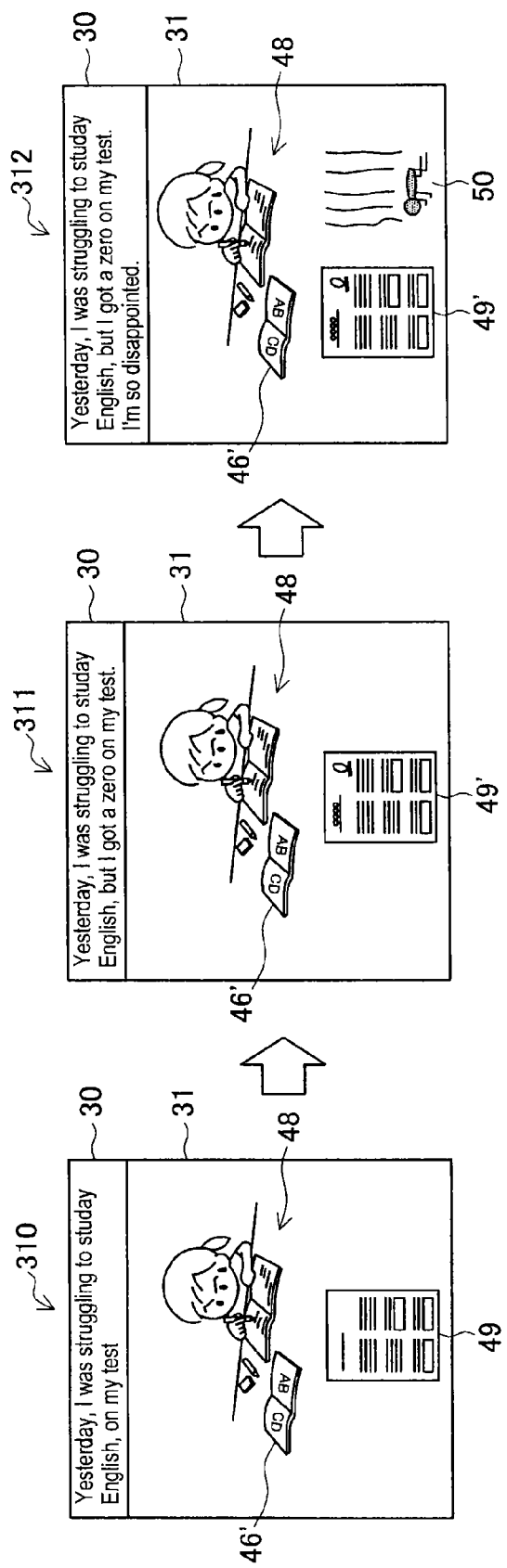

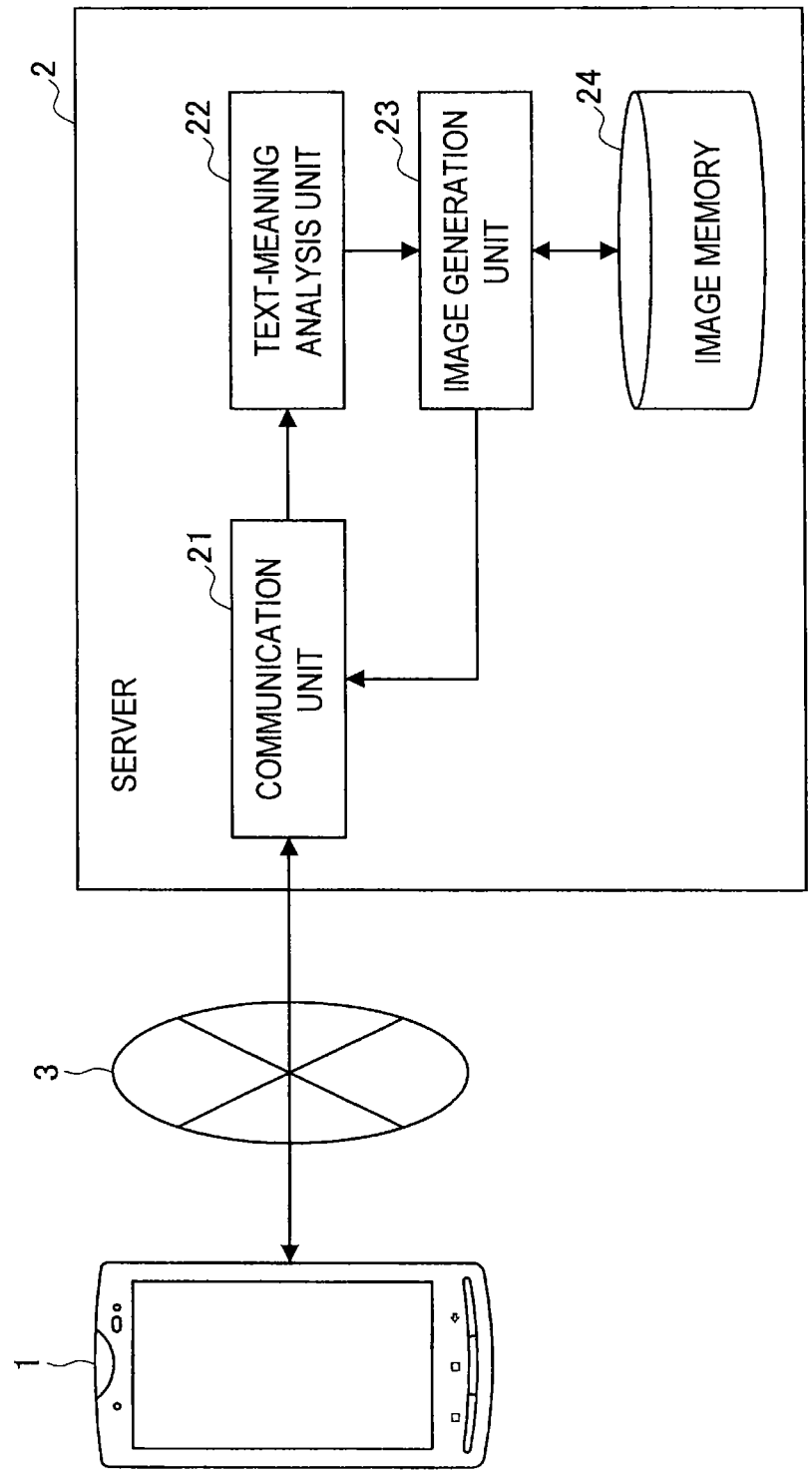

INFORMATION PROCESSING DEVICE, STORAGE MEDIUM, AND METHOD

CROSS REFERENCE TO RELATED APPLICATIONS

This application claims the benefit of Japanese Priority Patent Application JP 2013-168209 filed Aug. 13, 2013, the entire contents of which are incorporated herein by reference.

BACKGROUND

The present disclosure relates to an information processing device, a storage medium, and a method.

Recently, communication tools to supplement a sentence by adding images (still image/moving image) such as a pictorial symbol, a sticker, or an animation to a text have been spread in a two-way communication using the Internet.

An example of such communication tools includes an animation character (avatar) which substitutes for a role of a user as a copy or a personification of the user in a cyberspace. Since the avatar has a multi-layer structure and has a large data capacity, it is difficult for an avatar that is set in a service provided on a specific web page to be used in another service. On this issue, JP 2008-508634T proposes a system to provide a personal icon in any space in a network by using the personal icon having a single-layer structure.

SUMMARY

However, when using the communication tools such as the pictorial symbol, the sticker, or the animation, the user have to choose an image expressing what the user really wants to say from among many candidates, and it takes time and effort.

Moreover, the existing images are each a separate single image, and it is difficult for the user to arbitrarily edit the image. Accordingly, the image is sometimes not enough to express what the user really wants to say at that time.

Accordingly, the present disclosure proposes an information processing device, a storage medium, and a method that can automatically generate an image corresponding to an input word.

According to an embodiment of the present disclosure, there is provided an information processing device including an input unit to which words are input, an analysis unit configured to analyze meanings of the respective words, an image generation unit configured to generate single images corresponding to the respective words, and a display control unit configured to control the images generated by the image generation unit to be displayed on a display unit.

According to an embodiment of the present disclosure, there is provided a non-transitory computer-readable storage medium having a program stored therein, the program causing a computer to function as an input unit to which words are input, an analysis unit configured to analyze meanings of the respective words, an image generation unit configured to generate single images corresponding to the respective words, and a display control unit configured to control the images generated by the image generation unit to be displayed on a display unit.

According to an embodiment of the present disclosure, there is provided a method including analyzing meanings of respective words input to a user terminal, generating, by a processor, single images corresponding to the respective words, and transmitting the generated images to the user terminal so that the images are displayed on a display unit of the user terminal.

According to one or more of embodiments of the present disclosure, it becomes possible to automatically generate an image corresponding to an input word.

Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 4 is a diagram illustrating a first display example according to the embodiment;

FIG. 5 is a diagram illustrating the first display example according to the embodiment;

FIG. 6 is a diagram illustrating a second display example according to the embodiment;

FIG. 7 is a diagram illustrating the second display example according to the embodiment; and FIG. 8 is a diagram showing an overall configuration of an image generation system according to another embodiment of the present disclosure.

DETAILED DESCRIPTION OF THE EMBODIMENT(S)

Figure 1:
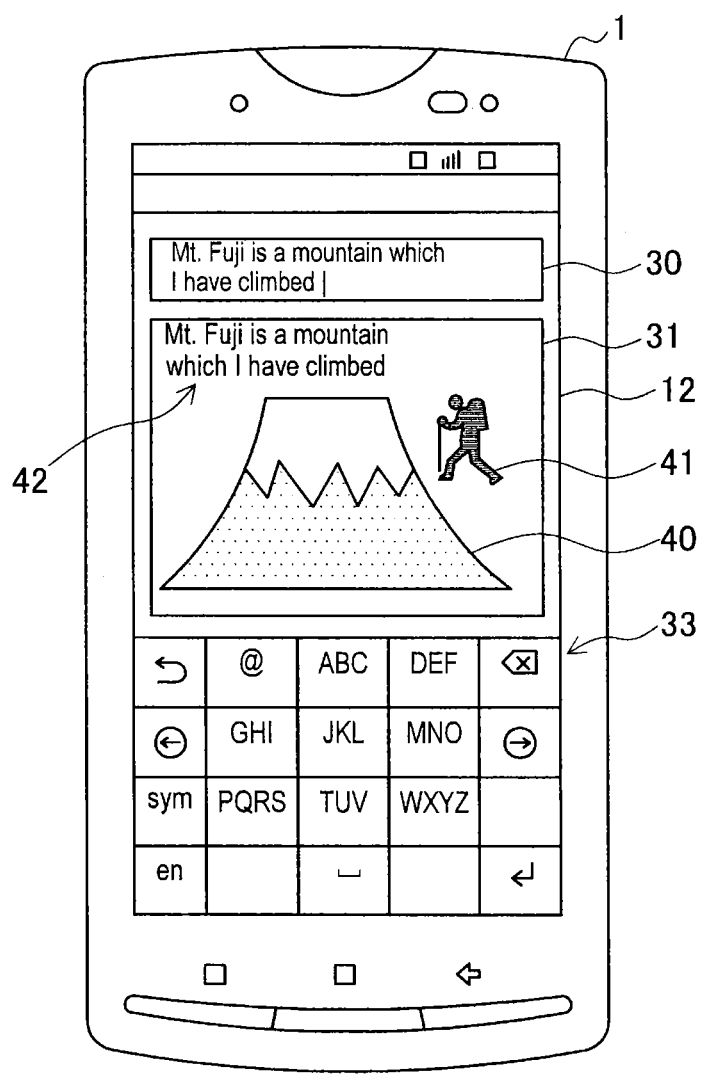
FIG. 1 is a diagram illustrating an overview of an information processing terminal according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Information Processing Terminal According to Embodiment of Present Disclosure
2. Basic Configuration and Operation Processing
2-1. Configuration
2-2. Operation Processing
3. Display Example
4. Another Embodiment
5. Conclusion

1. Overview of Information Processing Terminal According to Embodiment of Present Disclosure First, with reference to FIG. 1, an overview of an information processing terminal 1 (information processing device) according to an embodiment of the present disclosure will be explained. As shown in FIG. 1, a display unit 12 is provided over a surface of the information processing terminal 1 according to the present embodiment. The information processing terminal 1 is an example of the information processing device and is not limited to a smartphone shown in FIG. 1. For example, the information processing terminal 1 may be a cellular phone terminal, a tablet terminal, a personal computer (PC), a head mounted display (HMD), or a glasses type HMD.

The display unit 12 according to the present embodiment is provided with a touch sensor, and the user can perform operation input by directly touching a display screen.

As shown in FIG. 1, the display screen of the display unit 12 displays a word input box 30, an image display area 31, and a software keyboard 33. The display screen shown in FIG. 1 is an example of a massage input screen in a communication service such as an e-mail, a social networking service (SNS), a blog, and a microblog.

The user can input letters by performing a touch operation on the software keyboard 33 displayed on the display unit 12. The input letters are displayed in the word input box 30. At this time, the information processing terminal 1 according to the present embodiment automatically generates single images corresponding to respective words that were input and displays the images in the image display area 31.

For example, in a case where a sentence formed of words "Mt. Fuji is a mountain which I have climbed" has been input, an image 40 corresponding to a single word "Mt. Fuji" and an image 41 corresponding to a single word "climbed" are generated and displayed in an image display area 31. In another case where a sentence formed of words "I was struggling to study" has been input, an image corresponding to the words "I was struggling to study" is generated and displayed in the image display area 31. In the example shown in FIG. 1, an image 42 showing the input sentence is also generated and displayed in the image display area 31.

Next, the information processing terminal 1 packages the images displayed in the image display area 31 and transmits the package to an external device (an email server, a SNS server, a blog server, or the like).

As described above, according to the present embodiment, the user does not have to choose an image from many candidates, and images corresponding to input words are automatically generated. Accordingly, the user can generate massages with images without spending time and effort. In addition, since an image is generated in response to a meaning (context) of all words, the image more fitting for a meaning of a sentence can be generated and what the user really wants to say can be expressed.

The overview of the information processing terminal 1 according to the embodiment of the present disclosure has been explained in the above. Subsequently, a basic configuration and operation processing of the information processing terminal 1 according to an embodiment to the present disclosure will be explained.

2. Basic Configuration and Operation Processing 2-1. Configuration

Figure 2:
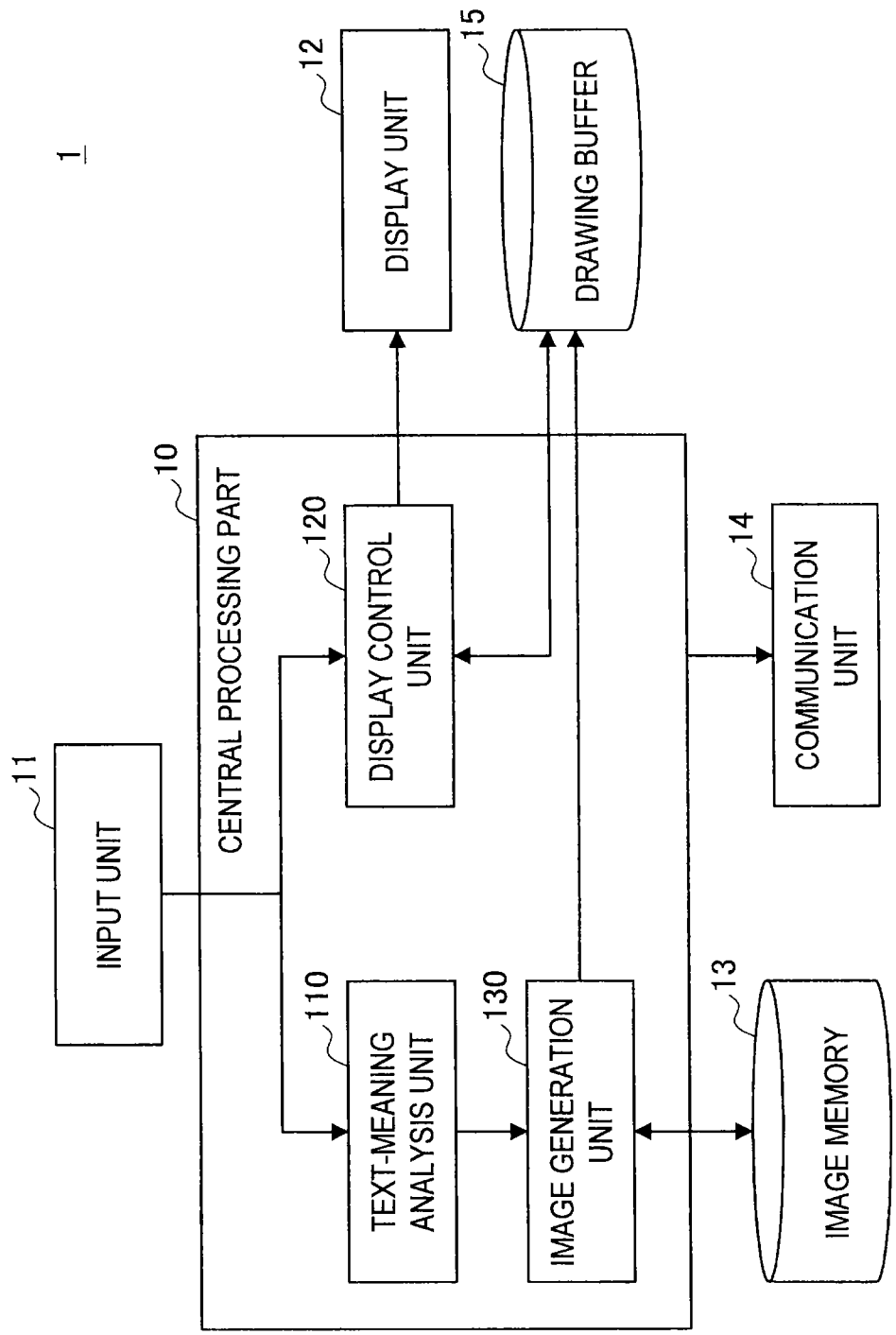
FIG. 2 is a block diagram showing an example of a main configuration of the information processing terminal according to the embodiment.

FIG. 2 is a block diagram showing an example of a main configuration of the information processing terminal 1 according to the embodiment. As shown in FIG. 2, the information processing terminal 1 includes a central processing part 10, an input unit 11, a display unit 12, image memory 13, a communication unit 14, and a drawing buffer 15.

(Input Unit)

The input unit 11 receives input performed by the user and outputs received input information to the central processing part 10. The input unit 11 is achieved by a button, a switch, a touch sensor to receive operation input performed on the display screen, and the like. For example, the input unit 11 detects a user operation on the software keyboard 33 displayed on the display unit 12, receives input of words, and outputs received word-input information (text data) to a text-meaning analysis unit 110 and a display control unit 120 in the central processing part 10.

The input unit 11 may be achieved by a microphone (sound collection unit). In this case, the user can input text data by using voice input.

(Central Processing Part)

The central processing part 10 is made up of a microcontroller equipped with a central processing unit (CPU), read-only memory (ROM), random access memory (RAM), non-volatile memory, and an interface unit, for example, and controls the respective components of the information processing terminal 1. As shown in FIG. 2, the central processing part 10 according to the embodiment functions as the text-meaning analysis unit 110, the display control unit 120, and an image generation unit 130.

The text-meaning analysis unit 110 analyzes a meaning of an input word on the basis of word-input information output from the input unit 11, and outputs an analysis result to the image generation unit 130. In a case where a plurality of words (sentence) has been input, the text-meaning analysis unit 110 divides the sentence into morphemes and phrases by text segmentation, analyzes dependency on respective morphemes and phrases, and analyzes meanings of words in accordance with context.

The display control unit 120 performs control in response to the word-input information output from the input unit 11 so that input words are displayed on the display unit 12. Specifically, the display control unit 120 displays words input through the software keyboard 33 on the word input box 30 shown in FIG. 1.

In addition, the display control unit 120 performs control so that an image generated by the image generation unit 130 is displayed on the display unit 12. Specifically, the display control unit 120 displays, in the image display area 31 shown in FIG. 1, the image that is generated by the image generation unit 130 and temporarily stored in the drawing buffer 15. In the embodiment, by using the drawing buffer 15 in such a manner, contents to be displayed on the display unit 12 can be preliminarily adjusted. Note that, it may also be possible for the display control unit 120 or the image generation unit 130 to have a function equivalent of the drawing buffer 15.

The display control unit 120 may perform control so that the words (for example, image 42 in the image display area 31 shown in FIG. 1) input from the input unit 11 are displayed together with the image generated by the image generation unit 130.

In addition, the display control unit 120 can add an image or can switch images to be displayed on the display unit 12 by switching displays on the display unit 12 every time when the drawing buffer 15 is updated in response to input of a text to the input unit 11 by the user.

On the basis of meaning analysis results of respective words output from the text-meaning analysis unit 110, the image generation unit 130 generates single images corresponding to the respective words. Specifically, the image generation unit 130 searches an image group stored in the image memory 13 for the single images corresponding to the respective words. For example, in a case where the sentence "Mt. Fuji is a mountain which I have climbed" has been input and the text-meaning analysis unit 110 analyzes meanings of "Mt. Fuji" and "climbed", the image generation unit 130 searches the image memory 13 for a single image 40 corresponding to "Mt. Fuji" and a single image 41 corresponding to "climbed".

The image generation unit 130 provides the display control unit 120 with the generated images through the drawing buffer 15. In a case where the display control unit 120 has a function equivalent of the drawing buffer 15 or a case where the display control unit 120 does not have the drawing buffer 15, the image generation unit 130 directly outputs the generated images to the display control unit 120.

Alternatively, the image generation unit 130 may generate a single image corresponding to a meaning of all the words (a sentence or phrases). For example, in a case where a sentence "I was struggling to study" has been input and the text-meaning analysis unit 110 analyzes meanings of "struggling" and "study", the image generation unit 130 searches the image memory 13 for a single image corresponding to both meanings of "struggling" and "study".

Alternatively, the image generation unit 130 may generate a single image corresponding to a meaning of all the words (a sentence or phrases) by combining a plurality of images. For example, in a case where a sentence "study English" has been input, the image generation unit 130 generates a single image by combining (for example, overlaying an image of a English book on an image of a desk) an image (for example, an image of a English book) corresponding to "English" and an image (for example, an image of a child studying at her desk) corresponding to "study".

In addition, the image generation unit 130 sequentially generates an image every time when word-input information is output from the input unit 11 (every time when a word is input). For example, when "Mt. Fuji is" has been input, the image generation unit 130 generates a single image corresponding to "Mt. Fuji" and outputs the single image to the display control unit 120. Next, when "a mountain which I have climbed" has been input, the image generation unit 130 generates a single image corresponding to "climbed" and outputs the single image to the display control unit 120. Accordingly, a single image corresponding to each word is sequentially added and displayed every time when a word is input.

Moreover, in response to input of a second word that is input subsequently to a first word, the image generation unit 130 may generate a single image corresponding to the first word and the second word and output the single image to the display control unit 120. In this case, the display control unit 120 performs control (switch display images) so that an image that is newly generated in correspondence with the first word and the second word is displayed instead of displaying the image generated in correspondence with the first word. For example, in a case where a second word "study" is input subsequently to a first word "struggling" was input, the image generation unit 130 generates a single image (for example, an image of a child struggling to study) corresponding to the both words and outputs the single image to the display control unit 120. In this case, the display control unit 120 controls display so as to switch from an image (for example, an image of an adult struggling to run) that was already generated and displayed in response to the input of the first word "struggling" to a single image (for example, the image of the child struggling to study) that is newly generated and corresponds to the both words. As described above, according to the embodiment, it is possible to generate an image more fitting for a meaning of a sentence in response to a dependency relation between a first word and a second word.

Note that, the above-described addition and switching of images may be achieved by rewriting all drawing contents in the drawing buffer 15 using the drawing buffer 15 every time when a text is input. Control of such addition and switching of images according to the embodiment will be described in detail in "2-2. Operation Processing".

(Display Unit)

The display unit 12 displays (reproduces) diverse kinds of content, a menu screen, an operation screen, an input screen, or the like on the basis of control performed by the central processing part 10. In addition, the display unit 12 is achieved by a liquid crystal display (LCD), or an organic light-emitting diode (OLED), for example.

As shown in FIG. 1, the display unit 12 according to the embodiment displays the images 40 and 41 corresponding to each input word according to control performed by the display control unit 120 of the central processing part 10.

(Image Memory)

The image memory 13 is an image storage unit configured to store diverse images (moving image and still image) to supplement meanings of words.

(Drawing Buffer)

The drawing buffer 15 is a region to temporarily store images to be displayed on the display unit 12. Specifically, in the drawing buffer 15, images generated by the image generation unit 130 are drawn. The images drawn in the drawing buffer 15 are read by the display control unit 120 and are displayed on the display unit 12.

(Communication Unit)

The communication unit 14 has functions of connecting with an external device in a wireless or wired manner and of transmitting and receiving data. For example, the communication unit 14 can connect to a wireless access point (AP) through a wireless LAN, infrared communication, or Wi-Fi (registered trademark), and can connect to a network through the wireless AP. Subsequently, the communication unit 14 can acquire, from a certain server in the network, diverse images to supplement meanings of words and a program constituting software for executing a series of processing according to the embodiment. Image data acquired in such a manner from the certain server in the network is stored in the image memory 13.

In addition, the communication unit 14 according to the embodiment can transmit the single image displayed on the display unit 12 or the package of the plurality of images to a certain communication server (the email server, the SNS server, the blog server, or the like).

The configuration of the information processing terminal 1 according to the embodiment has been explained in detail. Next, with reference to FIG. 3, operation processing of the information processing terminal 1 according to the embodiment will be explained in detail.

2-2. Operation Processing

Figure 3:
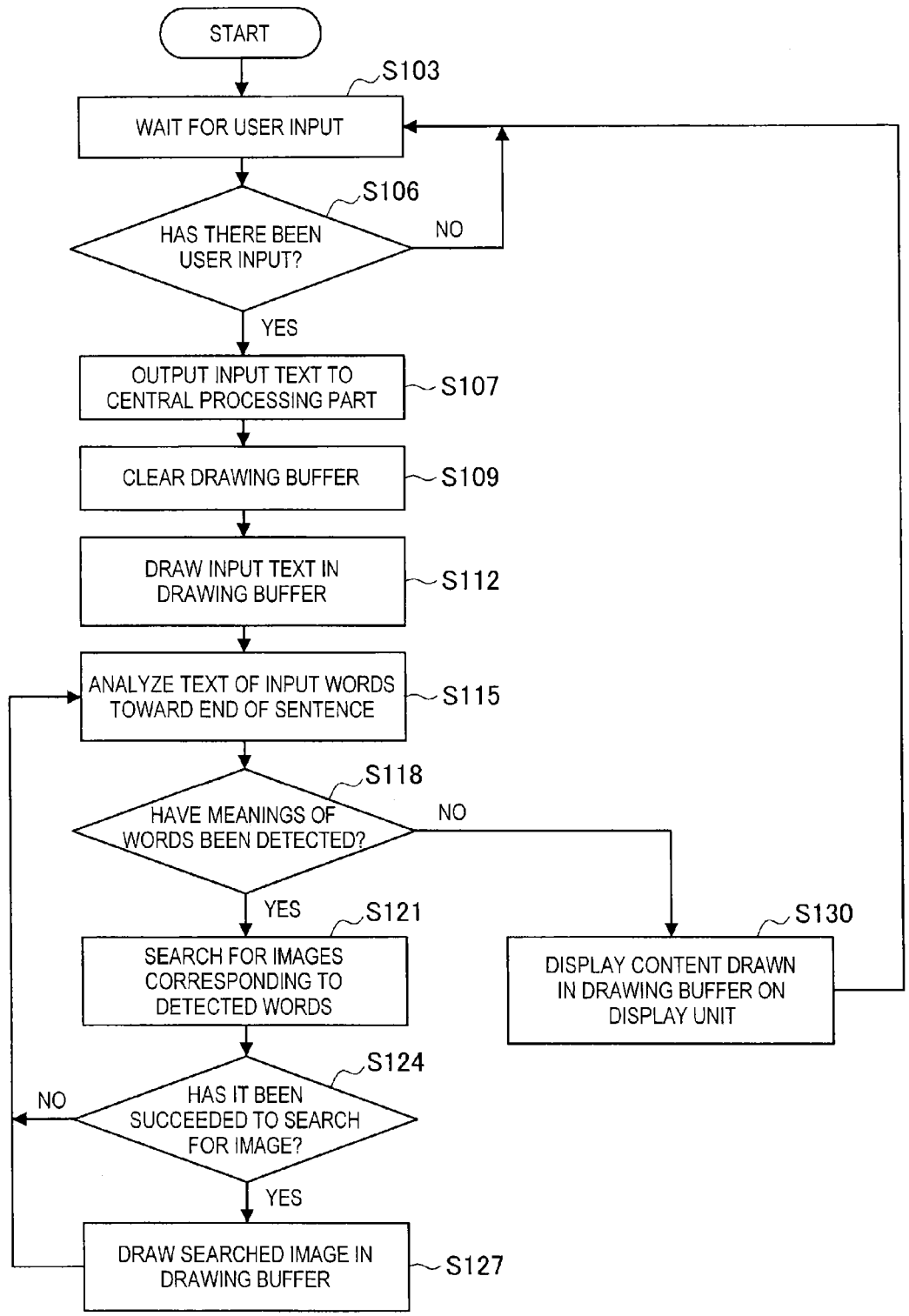
FIG. 3 is a flowchart showing operation processing of the information processing terminal according to the embodiment.

FIG. 3 is a flowchart showing operation processing of the information processing terminal 1 according to the embodiment. As shown in FIG. 3, the input unit 11 of the information processing terminal 1 first waits for user input in step S103.

Next, in a case where there has been user input (YES in step S106), the input unit 11 outputs received input information (text data) to the text-meaning analysis unit 110 and the display control unit 120 of the central processing part 10 in step S107. Note that, in the present specification, "user input" includes not only input of a new text (word) but also deletion of a text. For example, in a case where "Mt. Fuji is"

has been input and then operation input to delete the letters "Mt." has been performed, the input unit 11 output text deletion information to the central processing part 10.

Subsequently, in step S109, the central processing part 10 deletes an image (drawing contents) that is temporarily stored in the drawing buffer 15.

Next, in step S112, the central processing part 10 draws an input text in the drawing buffer 15.

Subsequently, in step S115, the text-meaning analysis unit 110 analyzes a text of the input words toward the end of the sentence on the basis of the input information (text data). Here, the text-meaning analysis unit 110 analyzes meanings of the whole text in order from the beginning of the sentence input through the input unit 11. For example, when "a mountain which I have climbed" has been subsequently input in a state where "Mt. Fuji is" has already been input and a single image corresponding to Mt. Fuji has been displayed on the display unit 12 in later-described step S130, the text-meaning analysis unit 110 sequentially analyzes meanings of the whole text "Mt. Fuji is a mountain which I have climbed" in order from the beginning of the sentence to the end of the sentence. Note that, it is also possible for the text-meaning analysis unit 110 to analyze meanings of words according to context (dependency relation).

Next, in step S118, the text-meaning analysis unit 110 determines whether or not the meanings of the words have been detected. For example, when analyzing the sentence "Mt. Fuji is", the text-meaning analysis unit 110 performs an analysis in order from the beginning of the sentence to the end of the sentence, and then a meaning of "Mt. Fuji" can be detected.

In a case where a meaning of a word can be detected (YES in S118), the image generation unit 130 searches the image memory 13 for a single image corresponding to the detected meaning of the word, in step S121.

In a case where it has been succeeded to search the image memory 13 for the image (YES in S124), the image generation unit 130 draws (temporarily stores) the searched image in the drawing buffer 15 in step S127.

Subsequently, the processing returns to step S115, and the text-meaning analysis unit 110 analyzes a meaning of a next word toward the end of the sentence. For example, when the sentence "Mt. Fuji is" is sequentially analyzed from the beginning of the sentence as described above, a meaning of "is" is analyzed after "Mt. Fuji". However, the meaning of "is" cannot be detected.

Next, in a case where the meaning of the word has not been detected (NO in S118), the display control unit 120 displays, on the display unit 12, the content drawn in the drawing buffer 15, in step S130. Here, since the input text has been drawn in the drawing buffer 15 according to step S112, the display control unit 120 displays, on the word input box 30, the input text drawn in the drawing buffer 15. Moreover, when the drawing buffer 15 includes the image drawn in the above-described step S127, the display control unit 120 displays the image in the image display area 31.

The operation processing of the information processing terminal 1 according to the embodiment has been explained in detail in the above. As described above, on the basis of the operation processing according to the embodiment, the drawing buffer is cleared in step S109, meanings of input words are analyzed in order from the beginning of the sentence to the end of the sentence in step S115, and single images corresponding to the respective words are generated again. Accordingly, it is possible to add or switch images. For example, in a case where "Mt. Fuji is" has been input, the image of Mt. Fuji has been displayed, and then "a mountain which I have climbed" has been input, the central processing part 10 deletes the image of Mt. Fuji drawn in the drawing buffer 15, analyzes a meaning of "Mt. Fuji is a mountain which I have climbed", draws the image of Mt. Fuji and an image of climbing in the drawing buffer 15, and displays the images so as to add the images.

On the other hand, for example, in a case where "I was struggling" has been input, an image of a person struggling to run has been displayed, and then "study" has been input, the central processing part 10 deletes the image in the drawing buffer 15 and analyzes a meaning of "I was struggling to study". Subsequently, the central processing part 10 newly draws an image of a person struggling to study in the drawing buffer on the basis of the dependency relation (context) and displays the image so as to switch the images.

3. Display Example

Next, with reference to FIGS. 4 to 7, a display example of an image generated in the embodiment will be described in detail.

3-1. First Display Example

FIGS. 4 and 5 are diagrams illustrating a first display example according to the embodiment. As shown in a display screen 300 in FIG. 4, an input text is displayed in the word input box 30, and any image is not displayed in the image display area 31 in a time period in which a meaning of a word cannot be detected.

Next, as shown in a display screen 301, when "Mt. Fuji is" has been input, the text-meaning analysis unit 110 succeeds in detecting a meaning of the word, the image generation unit 130 generates the image 40 of Mt. Fuji (specifically, the image generation unit 130 searches the image memory 13 for the image), and the image is displayed on the image display area 31.

Subsequently, as shown in a display screen 302, when "a mountain which I have climbed" has been input, the text-meaning analysis unit 110 detects a meaning from the beginning of the sentence, the image generation unit 130 generates the image 40 of Mt. Fuji and the image 41 of a climber, and the images are displayed in the image display area 31. At this time, it may also be possible for the display control unit 120 to approximate or overlay the image 41 of the climber to or on the image 40 of Mt. Fuji. On the screen, it seems like the image 41 of the climber is added in response to input of the text "a mountain which I have climbed".

Next, as shown in a display screen 303 in FIG. 5, when "It was a sunny day," has been input, the text-meaning analysis unit 110 detects a meaning from the beginning of the sentence, the image generation unit 130 generates the image 40 of Mt. Fuji, the image 41 of the climber, and an image 43 of the sun, and the images are displayed in the image display area 31. On the screen, it seems like the image 43 of the sun is added in response to input of the text "It was a sunny day,".

Subsequently, as shown in a display screen 304, "but so cold!" has been input, the text-meaning analysis unit 110 detects a meaning from the beginning of the sentence, the image generation unit 130 generates the image 40 of Mt. Fuji, the image 41 of the climber, the image 43 of the sun, and an image 44 of a wind representing coldness, and the images are displayed in the image display area 31. On the screen, it seems like the image 44 of the wind is added in response to input of the text "but so cold!".

As described above, the information processing terminal 1 according to the embodiment generates single images corresponding to respective words in response to text input (word input) performed by the user and displays the images on the display unit 12. Moreover, the information processing terminal 1 can also generate a single image corresponding to a word and additionally display the image every time when a text is input.

3-2. Second Display Example

FIGS. 6 and 7 are diagrams illustrating a second display example according to an embodiment. As shown in a display screen 306 in FIG. 6, even if a meaning of a word has been detected, an image is not displayed in the image display area 31 when the corresponding image has not been generated.

Next, as shown in a display screen 307, when "English" has been input, the text-meaning analysis unit 110 detects a meaning of the word, the image generation unit 1360 generates an image 46 of an English book, and the image is displayed in the image display area 31.

Subsequently, as shown in the display screen 308, when "I was struggling" has been input, the text-meaning analysis unit 110 detects meanings from the beginning of the sentence, the image generation unit 130 generates the image 46 of the English book and an image 47 indicating a struggling mood, and the images are displayed in the image display area 31. On the display screen it seems like the image 47 indicating a struggling mood is added in response to input of the text "I was struggling". Here, as shown in FIG. 6, an image of an adult struggling to run is chosen as the image 47 indicating a struggling mood.

Next, as shown in a display screen 309, when "study" has been input, the text-meaning analysis unit 110 detects a meaning from the beginning of the sentence, the image generation unit 130 generates an image 48 of a child struggling to study on the basis of a dependency relation (context) among the plurality of words, and the image is displayed on the image display area 31. As described above, according to the embodiment, an image more fitting for what the user really wants to say can be generated by generating a single image corresponding to a meaning of context (a plurality of words). In addition, the image generation unit 130 generates the image of the English book as a single image corresponding to "English". At this time, it is also possible for the image generation unit 130 to generate an image 46' of the English book that is edited (rotated, deformed, or the like) in accordance with the image 48. Next, the display control unit 120 displays the edited image 46' of the English book in an overlaid (combining) manner on the image 48, while displaying the image 48 of the child struggling to study. On a screen, it seems like the images are switched in response to input of the text "study".

Subsequently, as shown in a display screen 310 in FIG. 7, when "on my test" has been input, the text-meaning analysis unit 110 detects meanings from the beginning of the sentence, the image generation unit 130 generates the image 46' of the English book, an image 48 of the child struggling to study, and an image 49 of a test, and the images are displayed in the image display area 31.

Next, as shown in a display screen 311, when "but I got a zero" has been input, the text-meaning analysis unit 110 detects meanings from the beginning of the sentence, an image 49' of the test with zero point, the image 46' of the English book, and the image 48 of the child struggling to study are generated on the basis of the context, and the images are displayed in the image display area 31. On the screen, it seems like the image 49 is switched to the image 49' of the test with zero point in response to input of the text "but I got a zero".

Next, as shown in a display screen 312, when "I'm so disappointed." has been input, the text-meaning analysis unit 110 detects meanings from the beginning of the sentences, an image 50 indicating a disappointing mood is generated in addition to the images 49', 46', and 48, and the images are displayed in the image display area 31. On the screen, it seems like the image 50 is added in response to input of the text "I'm so disappointed.".

As described above, the information processing terminal 1 according to the embodiment can generate a single image corresponding to a meaning of all words in response to text input (word input) performed by the user, and can display the image on the display unit 12. Accordingly, the information processing terminal 1 according to the embodiment can generate an image more fitting for a meaning of context. In addition, the information processing terminal 1 can switch images to be displayed in response to the context including a subsequently-input text.

4. Another Embodiment

The above-described information processing terminal 1 according to the embodiment performs main processes locally. However, the information processing terminal 1 according to the embodiment is not limited thereto. For example, the information processing terminal 1 may be a cloud type (system type) that connects with a server 2 and in which main processing having a large workload is performed in the server. With reference to FIG. 8, the system will be explained below in detail.

FIG. 8 is a diagram showing an overall configuration of an image generation system according to another embodiment of the present disclosure. As shown in FIG. 8, the information processing terminal 1 (user terminal) connects with the server 2 (information processing device) through a network 3, and transmits and receives data.

As shown in FIG. 8, the server 2 (information processing device) includes a communication unit 21, a text-meaning analysis unit 22, an image generation unit 23, and image memory 24.

The communication unit 21 has functions of connecting with an external device through the network 3 and transmitting and receiving data. Specifically, the communication unit 21 receives input information (text data) from the information processing terminal 1 (user terminal) and outputs to the text-meaning analysis unit 22. In addition, the communication unit 21 transmits an image generated by the image generation unit 23 to the information processing terminal 1 (user terminal) so that the image is displayed on the display unit 12 of the information processing device 1.

The text-meaning analysis unit 22 analyzes a meaning of an input word on the basis of input information (text data) of the word transmitted from the information processing device 1 through the communication unit 21, and outputs an analysis result to the image generation unit 23. Note that, specific functions of the text-meaning analysis unit 22 are the same as the functions of the text-meaning analysis unit 110 according to the above embodiment.

On the basis of analysis results of meanings of respective words output from the text-meaning analysis unit 22, the image generation unit 23 generates single images corresponding to the respective words. For example, the image generation unit 23 searches an image group stored in the image memory 24 for the single images corresponding to the respective words. The image generation unit 23 outputs the images searched from the image memory 24 to the communication unit 21. Note that, specific functions of the image generation unit 23 are the same as the functions of the image generation unit 130 according to the above embodiment.

The image memory 24 is an image storage unit configured to store diverse images (moving image and still image) to supplement meanings of words.

The text-meaning analysis unit 22 and the image generation unit 23 are achieved as functions of the central processing part which is made up of a microcontroller equipped with a CPU, ROM, RAM, non-volatile memory, and an interface unit.

As described above, the server 2 according to the embodiment has main functions of the information processing device according to the embodiments of the present disclosure, and generates single images corresponding to respective words on the basis of input information transmitted from the information processing terminal 1. Furthermore, the server 2 controls the information processing terminal 1 so that the generated images are displayed on the display unit 12 of the information processing terminal 1.

On the other hand, the information processing terminal 1 successively transmits input information of words input by the user to the server 2 and draws images received from the server 2 in the drawing buffer 15, and the display control unit 120 controls the display unit 12 to display the images.

As described above, the image generation system according to the another embodiment of the present disclosure can reduce a processing load of the information processing terminal 1 by executing, in the server 2, the main configuration of the information processing device according to the embodiment of the present disclosure.

5. Conclusion

As described above, the information processing terminal 1 according to the embodiments of the present disclosure can generate single images corresponding to respective words in response to word input performed by the user, and can display the generated images. Accordingly, the user does not have to choose an image from among many candidates, and the user can generate massages with images without spending time and effort.

It should be understood by those skilled in the art that various modifications, combinations, sub-combinations and alterations may occur depending on design requirements and other factors insofar as they are within the scope of the appended claims or the equivalents thereof.

For example, a computer program for causing hardware such as a CPU, ROM, and RAM built in the information processing device 1 or the server 2 to realize the functions of the information processing device 1 or the server 2 can be created. A computer-readable storage medium having the computer program stored therein is also provided.

Note that, the steps of the processing of the information processing terminal 1 is not necessarily performed in time series in the order described in the attached flowchart. For example, the steps of the processing of the information processing terminal 1 may be processed in a different order from the order described in the flowchart or in a parallel manner. As a specific example, the steps S107 and S109 shown in FIG. 3 may be processed in a parallel manner or in a reverse order.

The effects described in the present specification are indicated merely for explanatory and illustrative purposes and the effects of the embodiment of the present disclosure are not limited to those given herein. That is, in addition to or in place of the effects given above, the technology according to the present disclosure may have other effects that are apparent to those of skill in the art from the disclosure of this specification.

Additionally, the present technology may also be configured as below.

(1) An information processing device including:
an input unit to which words are input;
an analysis unit configured to analyze meanings of the respective words;
an image generation unit configured to generate single images corresponding to the respective words; and
a display control unit configured to control the images generated by the image generation unit to be displayed on a display unit.

(2) The information processing device according to (1),
wherein the image generation unit generates a single image corresponding to a meaning of all the words.

(3) The information processing device according to (1) or (2),
wherein the image generation unit generates a single image corresponding to a meaning of all the words by combining images.

(4) The information processing device according to any one of (1) to (3),
wherein the image generation unit sequentially generates an image every time when a word is input from the input unit.

(5) The information processing device according to any one of (1) to (4),
wherein, in response to input of a second word that is input subsequently to a first word, the image generation unit generates an image corresponding to the first word and the second word, and
wherein the display control unit performs control to display the image generated in correspondence with the first word and the second word instead of displaying an image generated in correspondence with the first image.

(6) The information processing device according to any one of (1) to (5),
wherein, the display control unit performs control to display the words input from the input unit together with the images generated by the image generation unit.

(7) The information processing device according to any one of (1) to (6), further including:
a communication unit configured to be able to transmit the images generated by the image generation unit to an outside.

(8) The information processing device according to (7),
wherein the communication unit packages each of the images and each of the input words and transmits the packages to the outside.

(9) A non-transitory computer-readable storage medium having a program stored therein, the program causing a computer to function as:
an input unit to which words are input;
an analysis unit configured to analyze meanings of the respective words;
an image generation unit configured to generate single images corresponding to the respective words; and
a display control unit configured to control the images generated by the image generation unit to be displayed on a display unit.

(10) A method including:
analyzing meanings of respective words input to a user terminal;

generating, by a processor, single images corresponding to the respective words; and transmitting the generated images to the user terminal so that the images are displayed on a display unit of the user terminal.

What is claimed is:

1. An information processing device comprising:
circuitry configured to
detect a word string including a plurality of input words;
retrieve and analyze a meaning of each one of the respective plurality of input words, the meaning corresponding to at least one contextual association between the plurality of input words;
generate an image associated with at least one word of the plurality of input words;
sequentially modify the image based on a sequence of the detected plurality of input words and a dependency association between the at least one word and at least one other word of the plurality of input words; and
display the modified image.

2. The information processing device according to claim 1, wherein the circuitry is further configured to:
generate a single image corresponding to a meaning of all the plurality of input words.

3. The information processing device according to claim 1, wherein the circuitry is further configured to:
modify the image by generating a single image corresponding to a meaning of all the words by combining images.

4. The information processing device according to claim 1, wherein the circuitry is further configured to:
establish an image display session;
detect a new word string in addition to the detected word string detected within the image display session; and
adjust the modified image according to the detected new word string.

5. The information processing device according to claim 1, wherein the circuitry is further configured to:
generate a different modified image if the detected plurality of input words is arranged in a different dependency association.

6. The information processing device according to claim 1, wherein the circuitry is further configured to:
display the plurality of input words and generate an image associated with each word of the plurality of input words.

7. The information processing device according to claim 1, wherein the circuitry is further configured to:
transmit the modified image to an external device.

8. The information processing device according to claim 7, wherein the modified image is a package modified image including a series of packaged images, each packaged image corresponding to a package of a plurality of input words and an associated modified image.

9. The information processing device according to claim 1, further comprising:
deriving the dependency associations based on text segmentation used to divide the plurality of words into one or more morphemes and one or more phrases; and
deriving at least one contextual relationship between the one or more morphemes within the one or more phrases.

10. The information processing device according to claim 9, wherein the contextual relationship is based on a sequential order of the morpheme within the plurality of words.

11. The information processing device according to claim 10, wherein the meaning is modified based on the dependency association.

12. The information processing device according to claim 9, wherein the meaning of each one of the respective plurality of input words is detected, and
wherein the circuitry is further configured to search an image memory for one or more images corresponding to the detected meaning of each one of the respective plurality of input words.

13. A non-transitory computer-readable storage medium including computer-readable instructions, which when executed by circuitry, causes the circuitry to perform a method comprising:
detecting a word string including a plurality of input words;
retrieving and analyzing a meaning of each one of the respective plurality of input words, the meaning corresponding to at least one contextual association between the plurality of input words;
generating an image associated with at least one word of the plurality of input words;
sequentially modifying the image based on a sequence of the detected plurality of input words and a dependency association between the at least one word and at least one other word of the plurality of input words; and
displaying the modified image.

14. A method comprising:
detecting, with circuitry, a word string including a plurality of input words;
retrieving and analyzing, with the circuitry, a meaning of each one of the respective plurality of input words, the meaning corresponding to at least one contextual association between the plurality of input words;
generating, with the circuitry, an image associated with at least one word of the plurality of input words;
sequentially modifying, with the circuitry, the image based on a sequence of the detected plurality of input words and a dependency association between the at least one word and at least one other word of the plurality of input words; and
displaying the modified image.

15. The method according to claim 14, further comprising:
generating a different modified image if the detected plurality of input words is arranged in a different dependency association.

16. The method according to claim 14, further comprising:
generating a single image corresponding to a meaning of all the plurality of input words.

17. The method according to claim 14, further comprising:
modifying the image by generating a single image corresponding to a meaning of all the words by combining images.

18. The method of claim 14, further comprising:
transmitting the modified image to an external device.

19. The method of claim 18, further comprising:
packaging the modified image to include a series of packaged images, each packaged image corresponding to a package of a plurality of input words and an associated modified image.

* * * * *